S. H. HEGINBOTTOM.
CLIMBOUT AND SHOVEL.
APPLICATION FILED AUG. 3, 1916.
1,218,767.
Patented Mar. 13, 1917.
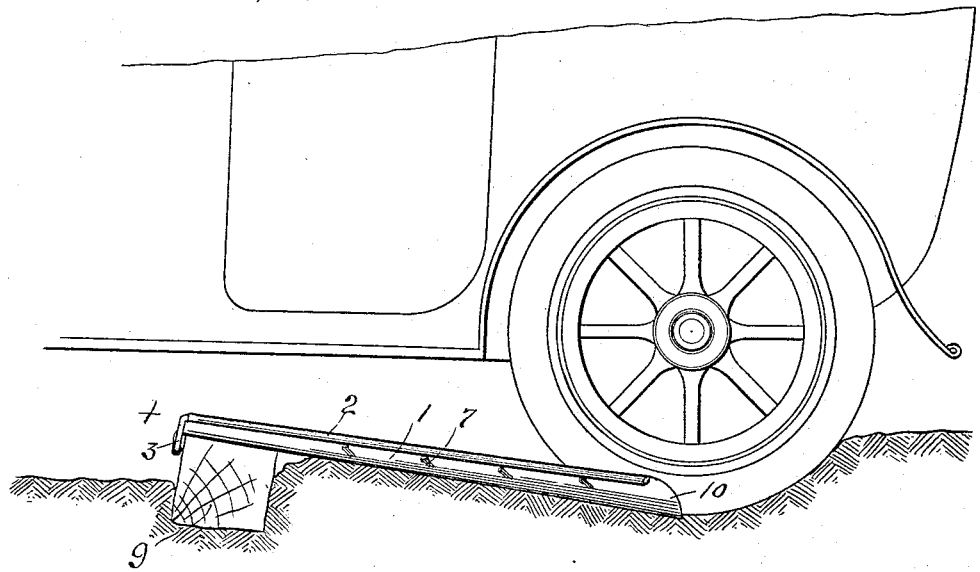
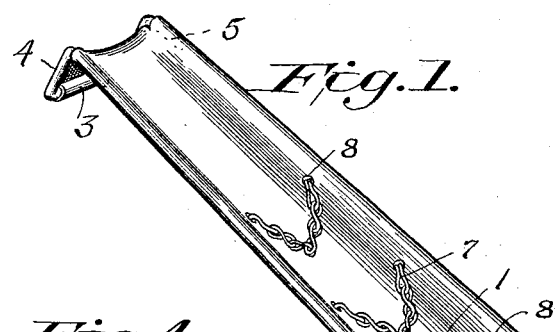
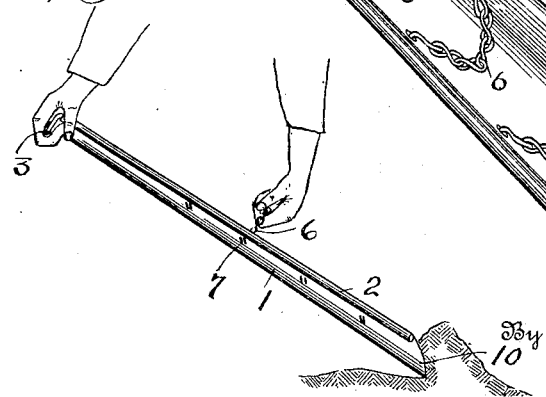
Inventor
Samuel H. Heginbottom.
Attorney

UNITED STATES PATENT OFFICE.

SAMUEL H. HEGINBOTTOM, OF SAGINAW, MICHIGAN.

CLIMBOUT AND SHOVEL.

1,218,767.　　　　Specification of Letters Patent.　　Patented Mar. 13, 1917.

Application filed August 3, 1916. Serial No. 112,923.

*To all whom it may concern:*

Be it known that I, SAMUEL H. HEGINBOTTOM, a citizen of the United States, residing at Saginaw, in the county of Saginaw, State of Michigan, have invented certain new and useful Improvements in Climbouts and Shovels, of which the following is a description, reference being had to the accompanying drawings, forming a part hereof.

My invention relates to devices for getting motor driven vehicles out of mud or soft ground and has for its object to provide a device for this purpose which will be adapted to be carried on the vehicle and will be capable of use both as a shovel for clearing away the ground from the vehicle wheels, digging out the wheels as it may be termed, and as a track for the wheel.

In driving automobiles or other motor vehicles, particularly on country roads, it not infrequently happens that one or both of the driven wheels drop into a mud hole or soft spot in the road so deeply that the vehicle cannot be made to extricate itself as the driven wheels turn in the soft ground without getting any hold, in other words the vehicle becomes mired, and with only the tools ordinarily carried on an automobile, it is often impossible to get it out of the mire and it becomes necessary to send for shovels to dig it out or for horses or another automobile to haul it out. The main difficulty is in getting the driven wheels onto something on which they will hold and not rotate without advancing the vehicle as they do in soft ground. It is the purpose of my invention to provide in a single article the means for clearing away the mud so far as may be necessary and also the means by which the driven wheel may be given sufficient hold to enable it to climb out.

With the above explained objects in view my invention consists in the construction and combination of elements hereinafter described and claimed.

Referring to the drawings Figure 1 is a perspective view of my improved device.

Fig. 2 is a cross sectional view of the device.

Fig. 3 shows my device arranged as a track for one of the rear, or driven wheels of an automobile and Fig. 4 shows my device in use as a shovel.

In the drawings 1 indicates the body portion of my device which consists of a strip of stout sheet metal wider at one end than at the other, bent into trough shape and preferably stiffened by having edges rolled as shown at 2. At its narrower end it is provided with a handle 3 formed by bending a rod 4 into shape for a handle with its ends 5 adapted to enter the hollows of the rolled over edges 2. The rod forming the handle is so bent that the handle is below the level of the bottom of the trough and the material of which the trough is formed is preferably bent downward and around the rod 4 so that the hollow of the trough is not obstructed by the handle. The device is provided at suitable points between its ends with cross chains 6 each provided at its ends with hooks 7 engaging openings 8 on opposite sides of the trough near its edges. These chains 6 are of sufficient length to lie loosely in the trough and to be capable of being grasped by one hand as shown in Fig. 4 while the other hand of the person using the device as a shovel, grasps the handle 3.

The use of the device as a shovel is clearly shown in Fig. 4. In using it as a track a plank 9 or piece of fence rail or the like is laid on the ground or in a cross trench excavated ahead of the wheel and the broad end of the device is thrust under the wheel as far as possible the narrow end resting on the plank 9 with the downturned handle 3 engaging its forward edge the device being arranged at an incline as shown in Fig. 3. Power being then applied to the wheel its tire engages the cross chains and it climbs up the trough and out of the mud hole.

The device is made of such size as to be readily carried in the automobile and is made of such weight as to be easily handled by one person as a shovel. The broad end of the device preferably extends beyond the edges as shown at 10 so as to readily enter the ground when used as a shovel.

Having thus described my invention what I claim is:

1. A device of the character described comprising a trough-shaped body having a handle at one end and a series of cross chains secured at their ends in the sides of the trough.

2. A device of the character described comprising a trough shaped body having rolled edges and having a handle extending downward from one end and a series of chains secured at their ends in the sides of the trough and of a length greater than the distance between the securing points.

3. A device of the character described comprising a trough shaped body having rolled edges and having a downwardly turned handle at one end and at the other end extending beyond the rolled edges to form a shovel end, and a series of chains arranged to lie in the trough with their ends secured in the sides of the trough.

This specification signed this 31st day of July A. D. 1916.

SAMUEL H. HEGINBOTTOM.

Copies of this patent may be obtained for five cents each, by addressing the "Commissioner of Patents, Washington, D. C."